US009411857B1

(12) United States Patent
Chechik et al.

(10) Patent No.: US 9,411,857 B1
(45) Date of Patent: Aug. 9, 2016

(54) GROUPING RELATED ENTITIES

(71) Applicant: GOOGLE INC., Mountain View, CA (US)

(72) Inventors: Gal Chechik, Tel Aviv (IL); Yaniv Leviathan, Tel Aviv (IL); Yoav Tzur, Tel Aviv (IL); Eyal Segalis, Tel Aviv (IL); Yossi Matias, Tel Aviv (IL)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 13/930,133

(22) Filed: Jun. 28, 2013

(51) Int. Cl.
*G06F 17/30* (2006.01)

(52) U.S. Cl.
CPC .................. *G06F 17/3053* (2013.01)

(58) Field of Classification Search
CPC ............... G06F 17/30864; G06F 17/30867; G06F 17/30734; G06F 17/30424; G06F 17/30321; G06F 17/30699; G06F 17/30958; G06F 17/30433; G06F 17/30604; G06F 17/3053
See application file for complete search history.

(56) References Cited

U.S. PATENT DOCUMENTS

| | | | |
|---|---|---|---|
| 5,245,608 A | 9/1993 | Deaton, Jr. et al. | |
| 7,926,111 B2 | 4/2011 | Oliver et al. | |
| 8,291,429 B2 | 10/2012 | Laverone et al. | |
| 8,386,509 B1 * | 2/2013 | Scofield | G06F 17/30699 707/706 |
| 8,719,758 B1 * | 5/2014 | Knapp | G06F 17/5077 716/118 |
| 8,725,744 B2 | 5/2014 | Setlur | |
| 2002/0194201 A1 * | 12/2002 | Wilbanks et al. | 707/104.1 |
| 2003/0187813 A1 * | 10/2003 | Goldman | G06Q 10/10 |
| 2005/0283753 A1 * | 12/2005 | Ho et al. | 717/102 |
| 2008/0270458 A1 * | 10/2008 | Gvelesiani | 707/103 R |
| 2008/0279141 A1 * | 11/2008 | Luss | H04L 45/128 370/329 |
| 2009/0027392 A1 * | 1/2009 | Jadhav | G06F 17/30958 345/440 |
| 2009/0265338 A1 * | 10/2009 | Kraft et al. | 707/5 |
| 2012/0030152 A1 * | 2/2012 | Pueyo et al. | 706/12 |
| 2012/0109966 A1 * | 5/2012 | Liang | G06F 17/30643 707/740 |

* cited by examiner

*Primary Examiner* — Scott A Waldron
*Assistant Examiner* — Fatima Mina
(74) *Attorney, Agent, or Firm* — Fish & Richardson P.C.

(57) ABSTRACT

Methods, systems, and apparatus, including computer programs encoded on computer storage media, for grouping related entities. One of the methods includes receiving a search request that includes query text that identifies a first entity. A first entity node in an entity graph that represents the first entity is identified. A highest ranked first group of related entity nodes from a ranking of a plurality of groups of related entity nodes is identified, wherein each related entity node in the first group is connected to the first entity node by a respective path from the related entity node through one or more links in an entity graph. A presentation of information associated with one or more entity nodes in the first group of related entity nodes is provided.

23 Claims, 4 Drawing Sheets

GROUPING RELATED ENTITIES

BACKGROUND

This specification relates to Internet search engines, and more particularly to providing information about groups of entities related to an entity identified by a search request.

A search system can provide one or more knowledge panels in response to a received search request. A knowledge panel is a user interface element that provides information related to a particular entity referenced by the search query. For example, the entity may be a person, place, country, landmark, animal, historical event, organization, business, sports team, sporting event, movie, song, album, game, work of art, concept, or any other entity.

In general, a knowledge panel provides information about the entity. For example, a knowledge panel for a famous singer may include the name of the singer, an image of the singer, a description of the singer, facts about the singer, content that identifies songs and albums recorded by the singer, and/or links to searches related to the singer. Other types of information and content can also be presented in the knowledge panel. Information presented in a knowledge panel can include content obtained from multiple disparate sources, e.g., multiple different web pages accessible over the Internet.

A search system can maintain an entity database that stores information about various entities. In some implementations, the system assigns a unique entity identifier to each entity. In some implementations, the entity database is curated. The system can assign one or more text string aliases to each entity. For example, the Statue of Liberty can be associated with aliases "the Statue of Liberty" and "Lady Liberty." Aliases need not be unique among entities. For example, "jaguar" can be an alias for both an animal and a car manufacturer.

The system can also store information about an entity's relationship to other entities. For example, the system can define a "located in" relationship between two entities to reflect, for example, that the Statue of Liberty is located in New York City. In some implementations, the system stores relationships between entities in a representation of an entity graph in which entity nodes in the entity graph represent distinct entities and links between nodes represent relationships between the entities. In this example, the system can maintain an entity node representing the Statue of Liberty, an entity node representing New York City, and a link between the entity nodes to represent that the Statue of Liberty is located in New York City.

SUMMARY

This specification describes how a system can provide information about groups of entities related to a particular entity identified by a search request. The system can group related entities according to a type of relationship with a particular entity and rank the groups of related entities. In general, the system can generate groups of related entities according to paths in an entity graph that lead to the same entity node and have a same path type. The groups of related entity nodes can be ranked using various criteria.

In general, one innovative aspect of the subject matter described in this specification can be embodied in methods that include the actions of receiving a search request that includes query text that identifies a first entity; identifying a first entity node in an entity graph that represents the first entity, wherein entity nodes in the entity graph each represent respective entities, wherein links between entity nodes in the entity graph each represent respective relationships between entities, and wherein each link has a particular relationship type; identifying a highest ranked first group of related entity nodes from a ranking of a plurality of groups of related entity nodes, wherein each related entity node in the first group is connected to the first entity node by a respective path from the related entity node through one or more links in the entity graph, and wherein each respective path from each related entity node to the first entity node has a same path type that is defined by relationship types of one or more links in the path; obtaining information associated with one or more entity nodes in the first group of related entity nodes; generating a presentation that includes the information associated with one or more entity nodes in the first group of related entity nodes; and providing the presentation in response to the search request. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The actions include determining a plurality of paths in the entity graph from a plurality of seed entity nodes in the entity graph to the first entity node; and generating the plurality of groups of related entity nodes from the plurality of paths from seed entity nodes to the first entity node, wherein seed entity nodes in each group of related entity nodes have a same path type to the first entity node, wherein a path type is defined by one or more relationship types for links between entity nodes on the path. Determining a plurality of paths in the entity graph comprises determining a first path having a first path type from a first seed entity node to the first entity node; and assigning a second path type to the first path based on two or more individual path types between the first seed entity node and the first entity node. The second path type represents a generalization of multiple individual path types in the first path. The ranking of the plurality of groups of related entity nodes is based on a respective measure of popularity of a relationship type of each group of related entity nodes. The ranking of the plurality of groups of related entity nodes is based on a respective measure of a number of user selections, from a first entity presentation, to other entity presentations having a relationship type corresponding to each group of related entity nodes. The actions include determining individual measures of relationship strength between the first entity node and entity nodes in each of the plurality of groups of related entity nodes; determining a respective an aggregate measure of relationship strength for each group of related entity nodes based on the individual measures of relationship strength between the first entity node and each entity node in the group of related entity nodes; and determining the ranking of the plurality of groups of related entity nodes based on the aggregate measures of relationship strength. Determining individual measures of relationship strength between the first entity node and entity nodes in each of the plurality of groups of related entity nodes comprises determining one or more relationship independent metrics of relationship strength. The one or more relationship independent metrics include a measure of co-occurrence, in a collection of documents, of a first text string alias that identifies the first entity and a respective alias that identifies each entity in the group of related entity nodes. The one or more relationship independent metrics include a measure of co-occurrence, in a plurality of received search queries, of a first text string alias that identifies the first entity and a respective text string alias that identifies each entity node in the group. The one or more relationship independent metrics include a measure of co-occurrence between a first text string alias that identifies the first entity occurring in search queries and a respective text string alias that identifies each entity node in the group occurring in search results for the search queries.

The subject matter described in this specification can be implemented in particular embodiments so as to realize one or more of the following advantages. Generating groups of related entities provides users with more intuitive information about relationships between entities and provides access to more related entities. Grouping related entities provides information about more entities in a compact presentation that requires less screen space. Ranking groups of related entities can help users find the most popular or most relevant groups of related entities, which can facilitate user exploration of related entities. Providing a text description with each of the groups of related entities can provide users with additional and easy-to-understand information about how the related entities are related to a particular entity.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
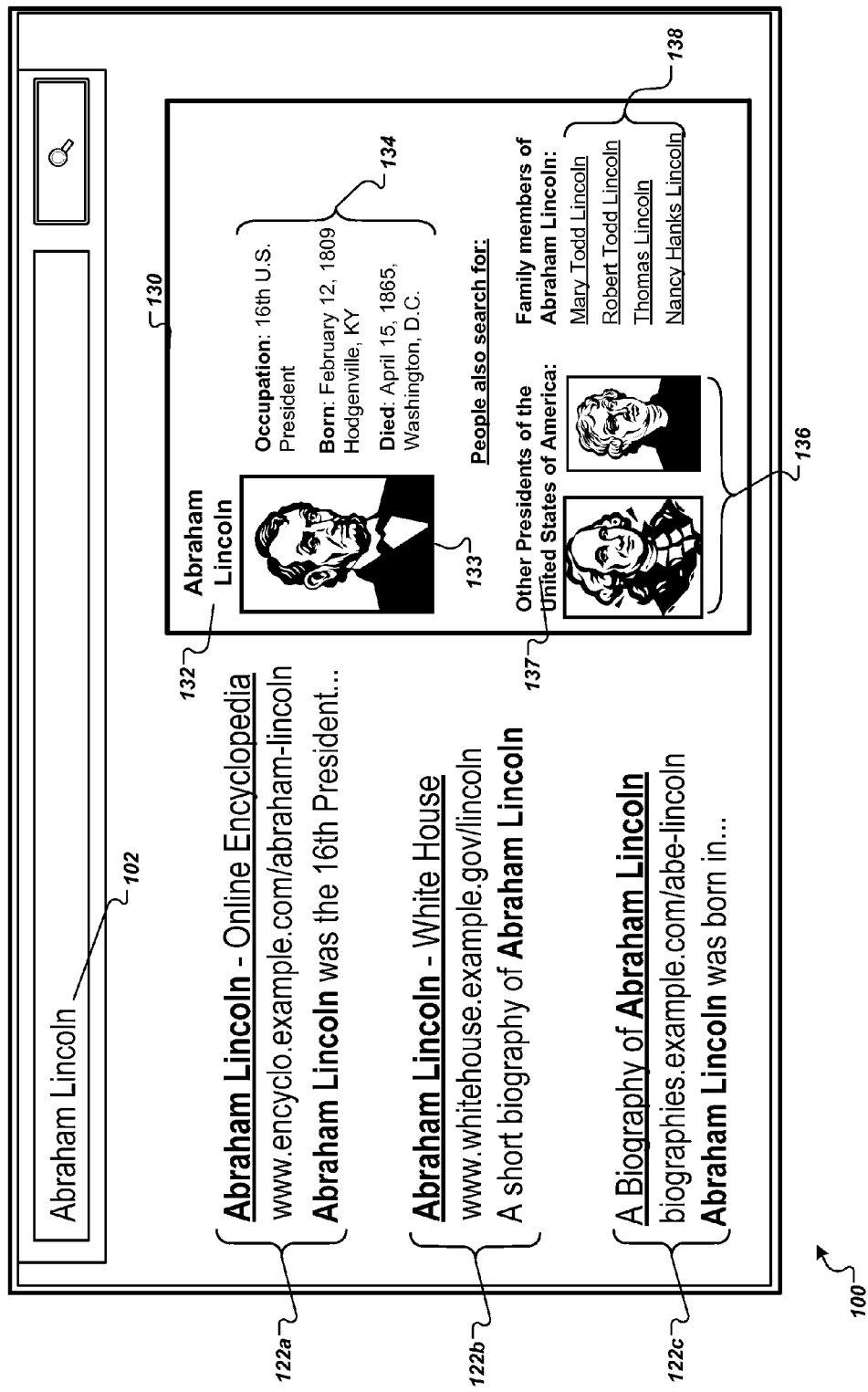
FIG. 1 illustrates an example search results page that includes a knowledge panel.

FIG. 1 illustrates an example search results page 100 that includes a knowledge panel 130. A user can submit the query 102 to a search system through a graphical user interface of a software application, e.g., a web browser, or through a user interface of some other software application installed on a user device, e.g., a spoken query issued through a speech recognition application installed on a mobile user device. In response to receiving the query 102, the search system can provide a search results page 100 in a form that can be presented on the user device. For example, the search results page 100 can be provided as a markup language document, e.g., a HyperText Markup Language document, and the user device can render the document, e.g., using a web browser, in order to present the search results page 100 on a display of the user device.

The search results page 100 includes three search results 122a-c that the search system has obtained in response to the query 102. Each of the search results 122a-c includes a title, a display link, and a text snippet. Each of the search results 122a-c is also linked to a respective resource, e.g., a web page at a location indicated by the display link. User selection of a search result will cause the application to navigate to the linked resource. Although only three search results are shown in the example search results page 100, a search system can also provide more or fewer than three search results in response to a query.

The search results page 100 also includes a knowledge panel 130 corresponding to an entity having an alias that is included in the search query 102. In this example, the entity is Abraham Lincoln.

The knowledge panel 130 includes various items of information about Abraham Lincoln. The knowledge panel 130 includes an entity name 132, a picture of the entity 133, and items of information 134, including an occupation, a date of birth, and a date of death.

The knowledge panel 130 also includes two groups of entities that are related to Abraham Lincoln. Group 136 includes images of other presidents of the United States. User selection of one of the images will cause the application to request information for that particular entity. For example, the search system can provide a knowledge panel for a selected one of the other U.S. presidents in the group 136 in response to the user selection. Group 138 includes a list of family members of Abraham Lincoln in the form of text links. User selection of the text links will cause the application to request information for that particular entity, and, in response, the search system can provide a corresponding knowledge panel. Other presentation formats to present groups of related entities can also be used. For example, the knowledge panel can include entity images presented in a stack of images in which only the first image is visible. User selection of the first image in the stack can open the group, e.g. by linking to a presentation that shows other entities in the group. User selection can also cause the application to navigate to a knowledge panel of the first entity or to a web site that includes more information about the entity in the first image.

Each group of related entities can also be presented with text 137 that describes the relationship between entities in the group and the entity shown in the knowledge panel. For example, the text 137 describes that entities in the group 136 are "Other Presidents of the United States of America." Similarly, the group 138 is presented with text that describes that the entities in the group are "Family Members of Abraham Lincoln." In some implementations, the text 137 is automatically generated based on relationships in an entity graph between the related entities in the group and the entity presented in the knowledge panel 130.

Figure 2:
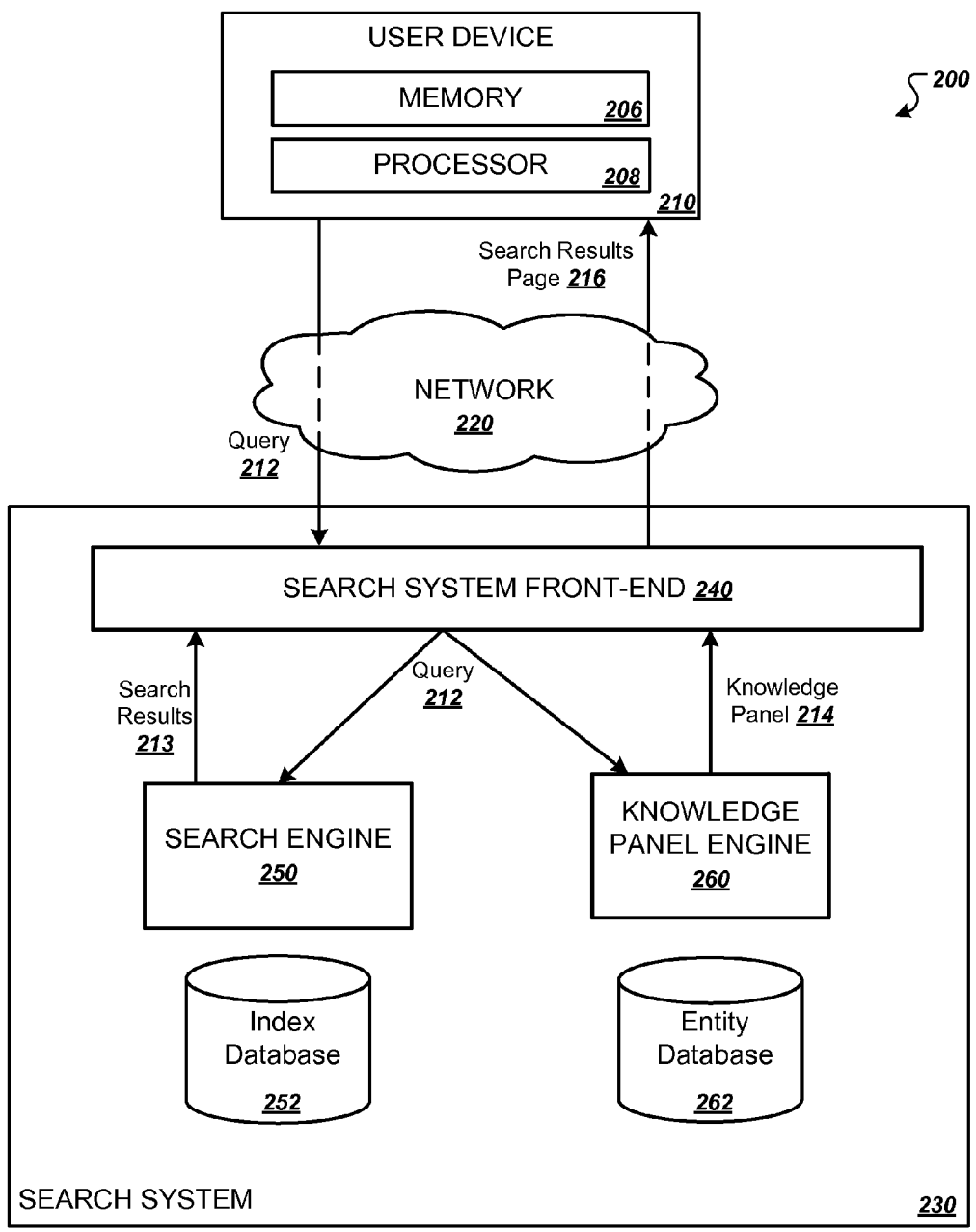
FIG. 2 is a diagram of an example system.

FIG. 2 is a diagram of an example system 200. In general, the system includes a user device 210 coupled to a search system 230 over a network 220. The search system 230 is an example of an information retrieval system in which the systems, components, and techniques described below can be implemented.

In operation, the user device 210 transmits a query 212 to the search system 230, e.g., over the network 220. The query 212 includes one or more terms and can include other information, for example, a location of the user device 210. The search system 230 generates a response, generally in the form of a search results page 216. The search results page 216 can include search results 213 that the search system 230 has identified as being responsive to the query 212. If the search system 230 determines that the query 212 includes an alias of an entity, the search system can generate a knowledge panel 214 that presents information about the entity, including one or more groups of entities related to the entity, and include the knowledge panel 214 in the search results page 216. The search system 230 transmits the search results page 216 over the network 220 back to the user device 210 for presentation to a user.

The user device 210 can be any appropriate type of computing device, e.g., mobile phone, tablet computer, notebook computer, music player, e-book reader, laptop or desktop computer, PDA (personal digital assistant), smart phone, a server, or other stationary or portable device, that includes one or more processors 208 for executing program instructions and memory 206, e.g., random access memory (RAM). The user device 210 can include non-volatile computer readable media that store software applications, e.g., a browser or layout engine, an input device, e.g., a keyboard or mouse, a communication interface, and a display device.

The network 220 can be, for example, a wireless cellular network, a wireless local area network (WLAN) or Wi-Fi network, a mobile telephone network or other telecommunications network, a wired Ethernet network, a private network such as an intranet, a public network such as the Internet, or any appropriate combination of such networks.

The search system 230 can be implemented as computer programs installed on one or more computers in one or more locations that are coupled to each through a network. The search system 230 includes a search system front end 240, a search engine 250, and a knowledge panel engine 260.

In general, the search system front end 240 receives the query 212 from the user device 210 and routes the query 212 to the search engine 250 and the knowledge panel engine 260. The search system front end 240 also provides the resulting search results page 216 that includes the search results 213 and the knowledge panel 214 to the user device 210. In doing so, the search system front end 240 acts as a gateway, or interface, between user devices and the search system 230.

The search engine 250 receives the query 212 and generates search results 213 that are responsive to the query. The search engine 250 will generally include an indexing engine for indexing resources in a collection of resources. For example, the search engine 250 can index web pages found in a collection of web pages, e.g., web pages on the Internet. A collection of resources indexed by the indexing engine may, but need not, be stored within search system 230, e.g., in index database 252. The search engine 250 can rank the search results 213 using conventional methods and route the ranked search results 213 back to search system front end 240 for inclusion in the search results page 216.

The knowledge panel engine 260 receives the query 212 and determines whether the search system 230 should provide a knowledge panel in a response to the query. The knowledge panel engine 260 can determine whether the search system 230 should provide a knowledge panel 214 using a data structure of the entity database 262 that maps a text alias to one or more entities, e.g. an entity alias index. For example, the alias "Bush" can be mapped to a set of entities having that alias, e.g., the entity "George W. Bush," the entity "George H. W. Bush," the entity for the rock band "Bush," and the entity for a category of plants having that alias. The entity alias index may also include a score for each entity that represents a likelihood that the alias refers to each particular entity. The knowledge panel engine 260 can use some or all of the query 212 as input to the entity alias index to identify a corresponding entity node in an entity graph. The knowledge panel engine 260 can then generate a knowledge panel 214 using information associated with the entity node in the entity graph, including information about one or more groups of related entities.

Figure 3:
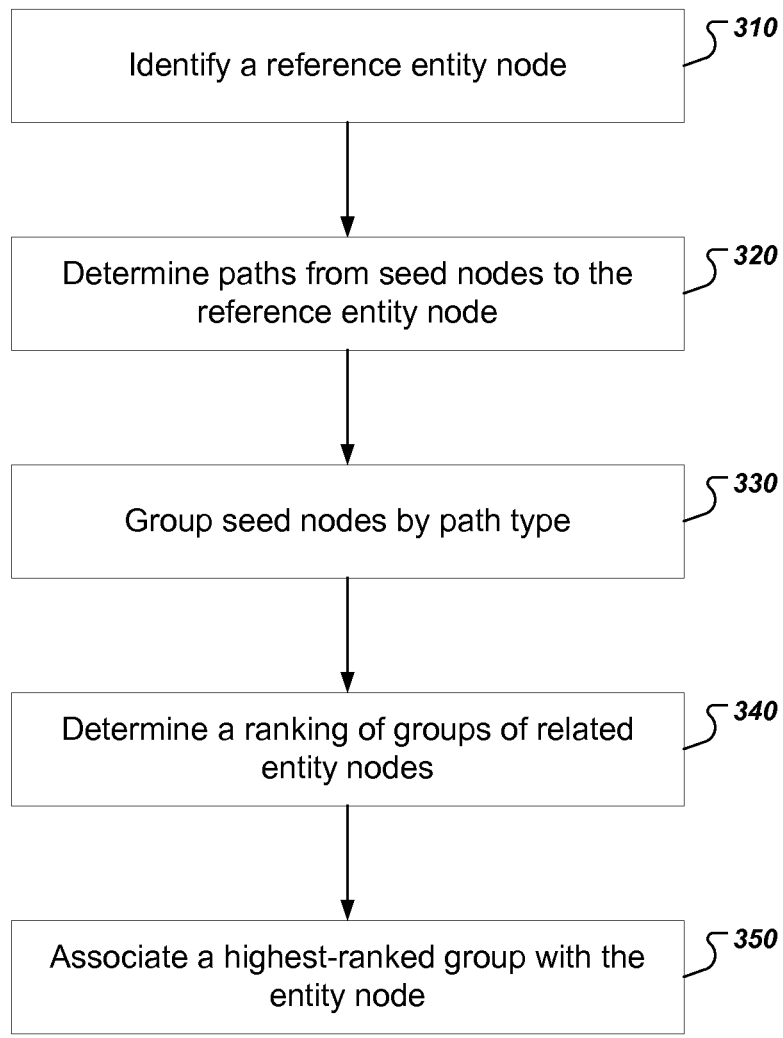
FIG. 3 is a flow chart of an example process for determining groups of related entities.

FIG. 3 is a flow chart of an example process for determining groups of related entities. The system can process relationships between entity nodes in an entity graph and group entities have a same relationship type. The system can then rank the groups of related entities using various criteria. The process can be implemented by one or more computer programs installed on one or more computers. The process will be described as being performed by a system of one or more computers, e.g. the knowledge panel engine 260 processing information in entity database 262 of FIG. 2.

The system identifies a reference entity node (310). The system can select any appropriate entity node in the entity graph to rank groups of entities that are related to the reference entity node. In some implementations, the system iterates over a subset of all entity nodes in the entity graph. For example, the system can compute search request statistics to identify a number of the most popular entity nodes in the entity graph and then iterate over the most popular entity nodes to determine groups of related entities.

The system determines paths from seed entity nodes to the reference entity node (320). The system can analyze links in the entity graph from one or more seed entity nodes to the reference entity node. Each seed entity node is an entity node from which the system starts a path. The system can use a subset of entity nodes in the entity graph as seed entity nodes to determine paths to the reference entity node.

Each link in the entity graph represents a relationship of a particular type between one entity node and another entity node. For example, the system can determine a path from a seed entity node representing the movie "True Lies" through a link representing the relationship [leading actor] to a reference entity node representing Arnold Schwarzenegger. Similarly, the system can determine a path from the entity node that represents the movie "Terminator" through a link representing the relationship [leading actor] to the reference entity node representing Arnold Schwarzenegger.

Links between entity nodes in the graph may also have an associated direction, and the system can determine paths in both link directions between nodes. For example, the system can also determine a separate path from the reference entity node representing Arnold Schwarzenegger through a link representing the relationship [leading actor in] to the destination entity node representing the movie "True Lies."

The system can iteratively determine paths in the graph up to a maximum length N, where N represents a number of links in a path. For example, for a path of length N=2, the system can determine a path from each seed entity node over two links, e.g. from the entity node representing Abraham Lincoln through a first link representing the relationship [president of] to the entity node representing the United States of America, and further through a second link representing the relationship [president] to the destination entity node representing Thomas Jefferson.

The system can characterize each path by a path type that is defined by the individual relationship types of links in the path. For example, the system can characterize a path having a [son of] relationship between two entity nodes to have a path type [son of]. The system can characterize a path through two [son of] relationships to have a path type [son of, son of].

The system can assign multiple path types to a single determined path. For example, the system can generate other path types according to a set of templates, which may be manually curated or generated automatically. For example, the system can generate a path type [grandson of] from an original [son of, son of] path type. The system can similarly generate a [other president] path type from an original [president of, president] path type. The system can also generalize certain path types. For example, a path type [son of, brother of, father of], e.g. a cousin relationship, can be generalized to be a [family member] path type. The entity graph may, but need not, already include an explicit link between seed and destination entity nodes for a particular path.

The system groups seed entity nodes by path type (330). The system can consider seed entity nodes to be in a same group of related entities if connected to a same destination entity node by a same path type. For example, the path from the entity node representing "True Lies" to the destination entity node for Arnold Schwarzenegger has the same path type, e.g. [leading actor] as a path from the entity node representing "Terminator" to the same destination entity node representing Arnold Schwarzenegger. Therefore, the system can generate a group that includes the seed entity nodes "True Lies" and "Terminator." Similarly, paths from seed entity nodes that represent Tad Lincoln and Robert Todd Lincoln to the destination entity node for Thomas Lincoln will have a same path type [son of, son of]. Therefore, the system can group the seed entity nodes for Tad Lincoln and Robert Todd Lincoln.

In some implementations, the system associates with each group a text string that describes the path type. The text string can be used to describe the relationship of the related entities with a particular entity and may be used to generate a presentation of the related entities, e.g. a knowledge panel. The system can generate the text strings automatically based on the path type used to group the related entities. For example, for the group having entities "True Lies" and "Terminator," the system can generate a text string "Arnold Schwarzenegger Movies" based on the path type [leading actor]. For the group having entities Tad Lincoln and Robert Todd Lincoln, the system can generate a text string "Grandchildren of Thomas Lincoln." The system can also generate multiple versions of the text string in different languages, either from the relationship type or by translating an initial version of the text string into another language.

The system can also enforce minimum and maximum group sizes, based on the number of entity nodes in each group. For example, the system can discard groups that have fewer than a minimum number of entity nodes, e.g. fewer than 3 entity nodes. The system can also discard larger groups that have more than a maximum number of entity nodes, e.g. more than 1000 entity nodes.

In some implementations, the system can alternatively break up large groups into multiple smaller groups based on other information in the entity graph. For example, if an entity node for a particularly prolific author is linked to 200 distinct books written by the author, the system can cluster the group of books into smaller subgroups based on dates of publication, books in a particular series, or books on a particular topic.

The system determines a ranking of groups of related entity nodes (340). A reference entity node can be associated with multiple groups of related entity nodes. For example, the entity node for Abraham Lincoln can be associated with a first group of entity nodes representing other presidents of the United States, as well as a second group of entity nodes representing family members of Abraham Lincoln. The system can rank groups of related entity nodes in order to select one or more of multiple groups for presentation in a knowledge panel.

The system can generate a ranking of the groups based on a variety of criteria.

One example criteria for ranking groups is a measure of relationship popularity for the path type. The system can compute a measure of relationship popularity according to how often the relationship of a particular path type occurs in the graph. For example, the entity graph may include many more links corresponding to a [lead actor] relationship than links corresponding to a [favorite food] relationship. The system can compute a score that represents relationship popularity for a path type p by analyzing paths k in the graph, given by:

$$\text{score} = \sum_k \text{delta}(p, e1_k, e2_k),$$

where delta(p, $e1_k$, $e2_k$) is 1 if the path type p exists between entities $e1_k$ and $e2_k$ and 0 otherwise. The system can alternatively compute a weighted score based on measure of the popularity of the individual entities linked by each path, given by:

$$\text{score} = \sum_k \text{delta}(p, e1_k, e2_k), \times \text{weight}(e1_k, e2_k),$$

where weight(p, $e1_k$, $e2_k$) is a measure of popularity of entities $e1_k$ and $e2_k$. For example, the system can compute a measure of popularity for each individual entity, e.g. as measured by counts or frequency of occurrences of entity aliases for entities $e1_k$ and $e2_k$ in web documents or search queries. The system can then compute a combined weight by computing a measure of central tendency between the individual measures of popularity, e.g. an arithmetic or geometric mean.

The system can also compute a measure of relationship popularity according to user selections that result in navigation from first entity presentations to other entity presentations of entities having a particular relationship type with the first entities. For example, the system can compute a count of user selections that result in navigation from a first entity presentation to a second entity presentation of an entity having a particular relationship type with the first entity, e.g. a user selection that results in a navigation from a knowledge panel for Abraham Lincoln to a knowledge panel for Thomas Jefferson.

The system can also rank groups of related entity nodes according to a measure of relationship strength between the reference entity node and individual related entity nodes in a group. Thus, the system can rank a group of entity nodes having stronger individual relationships with the reference entity node higher than a group of entity nodes having weaker individual relationships with the reference entity node.

The system can compute a measure of relationship strength between two entity nodes based on occurrences of entity aliases in a collection of documents, e.g. documents found on the Internet. For example, the system can analyze a collection of web documents to compute a measure of co-occurrence in the web documents between aliases for Abraham Lincoln and aliases for Thomas Jefferson. The system can alternatively or in addition compute a measure of co-occurrences of entity aliases in the same paragraph or same sentence in the web documents.

The system can also compute the measure of relationship strength based on occurrences of entity aliases in search queries. For example, the system can analyze records of search queries to compute a measure of co-occurrence in the search queries between an alias for Abraham Lincoln and an alias for Thomas Jefferson.

The system can also compute the measure of relationship strength based on occurrences of entity aliases in search queries and search results provided for the search queries. For example, the system can analyze records of search queries and search results provided for search queries to compute a measure of co-occurrence between an alias for Abraham Lincoln occurring in a search query and an alias for Thomas Jefferson occurring in search results provided for the search query.

The system can also combine one or more of the measure of relationship strength into a single score representing the relationship strength between the entities. For example, the system can compute weights for each of the measures of relationship strength, where the weights indicate a relative importance of each particular measure. The system can use the weights to compute a weighted measure of relationship strength between the entities.

The system can further compute an aggregate measure of relationship strength for a group based on individual measures of relationship strength between the reference entity node and each related entity node in a group. The system can compute any appropriate measure of central tendency for the individual measures of relationship strength in a group, e.g. an arithmetic mean or geometric mean, a median, a mode, a minimum, or a maximum.

The system can combine any particular combination of relationship-dependent metrics, e.g. relationship popularity, and relationship-independent metrics, e.g. query co-occurrence frequency, to compute a score for each group of related entities. The system can then rank the groups of related entities by the computed score for each group.

The system associates a highest-ranked group with the entity node (350). The system can associate the results of ranking the groups of related entities with the reference entity node. For example, the system can store a representation of the highest-ranking group with the reference entity node, which can be, e.g. a set of related entity node identifiers. The system can also store the generated text string that describes the relationship of the reference entity node with the group of related entities, e.g. "Other U.S. Presidents."

Figure 4:
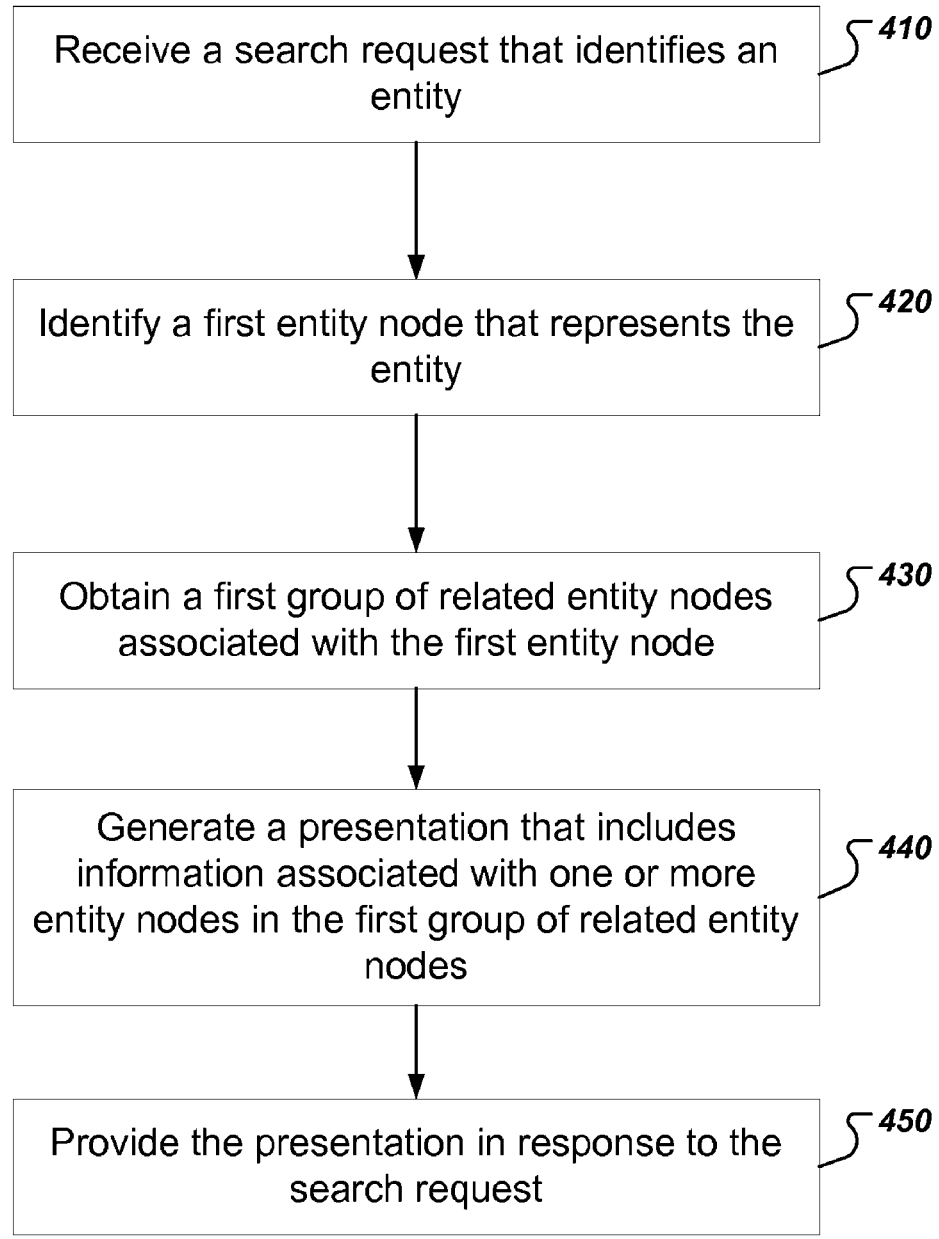
FIG. 4 is a flow chart of an example process for providing a knowledge panel having a group of related entities.

FIG. 4 is a flow chart of an example process for providing a knowledge panel having a group of related entities. In general, the system receives a search request and identifies an entity corresponding to the search request. The system provides a knowledge panel for the entity that includes information about a group of entities related to the entity corresponding to the search request. The process can be implemented by one or more computer programs installed on one or more computers. The process will be described as being performed by a system of one or more computers, e.g. the search system 230 of FIG. 2.

The system receives a search request that identifies an entity (410). For example, the search request can be a received search query that includes an alias for the particular entity. The search request can also be an explicit web page request for information about a particular entity.

The system identifies a first entity node that represents the entity (420).

The system obtains a first group of related entity nodes associated with the first entity node (430). The system obtains the group of related entity nodes and can also obtain a text string that describes the relationship between the entity node and the group of related entity nodes.

The system generates a presentation that includes information associated with one or more entity nodes in the first group of related entity nodes (440). The system can generate a knowledge panel that includes information about the related group of entities, e.g. as a list of related entities as shown in FIG. 1. The presentation may also include stacks of images of the related entities or word clouds that emphasize related entities according to relationship strength.

The system provides the presentation in response to the search request (450).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving a search request that includes query text that identifies a first entity;
identifying in an entity graph a first entity node that represents the first entity, wherein entity nodes in the entity graph each represent respective entities, wherein each link in the entity graph connects a corresponding pair of entity nodes and has a respective relationship type, each relationship type representing a corresponding relationship between the entities represented by the entity nodes connected by the link;
identifying a plurality of groups of related entity nodes for the first entity node, wherein for each group, the nodes in the group are each connected to the first entity node by a respective path having a same path type specific to the group, each path between the first entity node and each node in the group having multiple sequential links in the entity graph, wherein the path type for each respective path between the first entity node and each node in the group is defined by a same ordered sequence of relationship types of the multiple sequential links in the entity graph between the first entity node and the node along the path;
determining that a first group of related entity nodes is a highest-ranked group of related entity nodes in a ranking of the plurality of groups of related entity nodes;

obtaining information describing one or more related entities represented by one or more entity nodes in the first group of related entity nodes;

generating a presentation that includes the information describing the one or more related entities represented by the one or more entity nodes in the first group of related entity nodes; and providing the presentation in response to the search request.

2. The method of claim 1, further comprising:

determining a plurality of paths in the entity graph from a plurality of seed entity nodes in the entity graph to the first entity node; and generating the plurality of groups of related entity nodes from the plurality of paths from seed entity nodes to the first entity node, wherein seed entity nodes in each group of related entity nodes have a same path type to the first entity node, wherein a path type is defined by one or more relationship types for links between entity nodes on the path.

3. The method of claim 1, wherein determining a plurality of paths in the entity graph comprises:

determining a first path having a first path type from a first seed entity node to the first entity node; and assigning a second path type to the first path based on two or more individual path types between the first seed entity node and the first entity node.

4. The method of claim 3, wherein the second path type represents a generalization of multiple individual path types in the first path.

5. The method of claim 1, wherein the ranking of the plurality of groups of related entity nodes is based on a respective measure of popularity of a relationship type of each group of related entity nodes.

6. The method of claim 1, wherein the ranking of the plurality of groups of related entity nodes is based on a respective measure of a number of user selections, from a first entity presentation, to other entity presentations having a relationship type corresponding to each group of related entity nodes.

7. The method of claim 1, further comprising:

determining individual measures of relationship strength between the first entity node and entity nodes in each of the plurality of groups of related entity nodes;

determining a respective aggregate measure of relationship strength for each group of related entity nodes based on the individual measures of relationship strength between the first entity node and each entity node in the group of related entity nodes; and determining the ranking of the plurality of groups of related entity nodes based on the aggregate measures of relationship strength.

8. The method of claim 7, wherein determining individual measures of relationship strength between the first entity node and entity nodes in each of the plurality of groups of related entity nodes comprises determining one or more relationship-independent metrics of relationship strength.

9. The method of claim 8, wherein the one or more relationship-independent metrics include a measure of co-occurrence, in a collection of documents, of a first text string alias that identifies the first entity and a respective alias that identifies each entity in the group of related entity nodes.

10. The method of claim 8, wherein the one or more relationship-independent metrics include a measure of co-occurrence, in a plurality of received search queries, of a first text string alias that identifies the first entity and a respective text string alias that identifies each entity node in the group.

11. The method of claim 8, wherein the one or more relationship-independent metrics include a measure of co-occurrence between a first text string alias that identifies the first entity occurring in search queries and a respective text string alias that identifies each entity node in the group occurring in search results for the search queries.

12. A system comprising:

one or more computers and one or more storage devices storing instructions that are operable, when executed by the one or more computers, to cause the one or more computers to perform operations comprising:

receiving a search request that includes query text that identifies a first entity;

identifying in an entity graph a first entity node that represents the first entity, wherein entity nodes in the entity graph each represent respective entities, wherein each link in the entity graph connects a corresponding pair of entity nodes and has a respective relationship type, each relationship type representing a corresponding relationship between the entities represented by the entity nodes connected by the link;

identifying a plurality of groups of related entity nodes for the first entity node, wherein for each group, the nodes in the group are each connected to the first entity node by a respective path having a same path type specific to the group, each path between the first entity node and each node in the group having multiple sequential links in the entity graph, wherein the path type for each respective path between the first entity node and each node in the group is defined by a same ordered sequence of relationship types of the multiple sequential links in the entity graph between the first entity node and the node along the path;

determining that a first group of related entity nodes is a highest-ranked group of related entity nodes in a ranking of the plurality of groups of related entity nodes;

obtaining information describing one or more related entities represented by one or more entity nodes in the first group of related entity nodes;

generating a presentation that includes the information describing the one or more related entities represented by the one or more entity nodes in the first group of related entity nodes; and providing the presentation in response to the search request.

13. The system of claim 12, wherein the operations further comprise:

determining a plurality of paths in the entity graph from a plurality of seed entity nodes in the entity graph to the first entity node; and generating the plurality of groups of related entity nodes from the plurality of paths from seed entity nodes to the first entity node, wherein seed entity nodes in each group of related entity nodes have a same path type to the first entity node, wherein a path type is defined by one or more relationship types for links between entity nodes on the path.

14. The system of claim 12, wherein determining a plurality of paths in the entity graph comprises:

determining a first path having a first path type from a first seed entity node to the first entity node; and assigning a second path type to the first path based on two or more individual path types between the first seed entity node and the first entity node.

15. The system of claim 14, wherein the second path type represents a generalization of multiple individual path types in the first path.

16. The system of claim 12, wherein the ranking of the plurality of groups of related entity nodes is based on a respective measure of popularity of a relationship type of each group of related entity nodes.

17. The system of claim 12, wherein the ranking of the plurality of groups of related entity nodes is based on a respective measure of a number of user selections, from a first entity presentation, to other entity presentations having a relationship type corresponding to each group of related entity nodes.

18. The system of claim 12, wherein the operations further comprise:
   determining individual measures of relationship strength between the first entity node and entity nodes in each of the plurality of groups of related entity nodes;
   determining a respective aggregate measure of relationship strength for each group of related entity nodes based on the individual measures of relationship strength between the first entity node and each entity node in the group of related entity nodes; and
   determining the ranking of the plurality of groups of related entity nodes based on the aggregate measures of relationship strength.

19. The system of claim 18, wherein determining individual measures of relationship strength between the first entity node and entity nodes in each of the plurality of groups of related entity nodes comprises determining one or more relationship independent metrics of relationship strength.

20. The system of claim 19, wherein the one or more relationship independent metrics include a measure of co-occurrence, in a collection of documents, of a first text string alias that identifies the first entity and a respective alias that identifies each entity in the group of related entity nodes.

21. The system of claim 19, wherein the one or more relationship independent metrics include a measure of co-occurrence, in a plurality of received search queries, of a first text string alias that identifies the first entity and a respective text string alias that identifies each entity node in the group.

22. The system of claim 19, wherein the one or more relationship independent metrics include a measure of co-occurrence between a first text string alias that identifies the first entity occurring in search queries and a respective text string alias that identifies each entity node in the group occurring in search results for the search queries.

23. A computer program product, encoded on one or more non-transitory computer storage media, comprising instructions that when executed by one or more computers cause the one or more computers to perform operations comprising:
   receiving a search request that includes query text that identifies a first entity;
   identifying in an entity graph a first entity node that represents the first entity, wherein entity nodes in the entity graph each represent respective entities, wherein each link in the entity graph connects a corresponding pair of entity nodes and has a respective relationship type, each relationship type representing a corresponding relationship between the entities represented by the entity nodes connected by the link;
   identifying a plurality of groups of related entity nodes for the first entity node, wherein for each group, the nodes in the group are each connected to the first entity node by a respective path having a same path type specific to the group, each path between the first entity node and each node in the group having multiple sequential links in the entity graph, wherein the path type for each respective path between the first entity node and each node in the group is defined by a same ordered sequence of relationship types of the multiple sequential links in the entity graph between the first entity node and the node along the path;
   determining that a first group of related entity nodes is a highest-ranked group of related entity nodes in a ranking of the plurality of groups of related entity nodes;
   obtaining information describing one or more related entities represented by one or more entity nodes in the first group of related entity nodes;
   generating a presentation that includes the information describing the one or more related entities represented by the one or more entity nodes in the first group of related entity nodes; and
   providing the presentation in response to the search request.

* * * * *